United States Patent Office 2,976,284
Patented Mar. 21, 1961

2,976,284
19 - HYDROXYPREGNENE - 3,11,20 - TRIONES, DERIVATIVES AND INTERMEDIATE 1,19-ISOPROPYLIDENEDIOXY STEROIDS USED IN THEIR PREPARATION

John S. Baran, Chicago, Ill., assignor to G. D. Searle & Co., Chicago, Ill., a corporation of Delaware No Drawing. Filed Sept. 28, 1959, Ser. No. 842,566

5 Claims. (Cl. 260—239.55)

The present invention relates to 11,19-isopropylidenedioxy steroids and to their 19-hydroxy-pregnene-3,11,20-trione derivatives. The 1,19-isopropylidenedioxy derivatives of this invention can be represented by the general structural formula

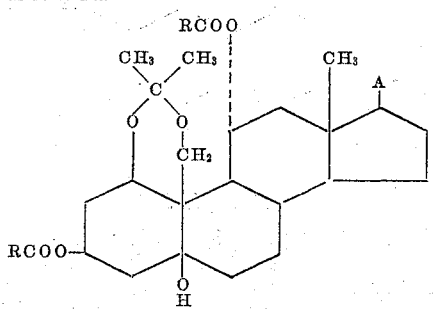

In this formula A can represent a

—CO—CH$_3$, —CO—CH$_2$I, —CO—CH$_2$OH— or

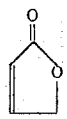

radical. The radical R can represent such lower alkyl radicals as methyl, ethyl, straight chain or branched propyl, butyl, amyl, or hexyl.

The compounds of the foregoing structural formula are conveniently prepared using as a starting material ouabagenin 1,19-acetonide (Mannich and Siewert, Berichte 75: 737; 1942). This compound is first acylated in the 3- and 11-positions by treatment with an alkanoic acid anhydride of the structural formula (R—CO)$_2$O and the resulting diacylate is then selectively dehydrated at carbon-14 with thionyl chloride in pyridine to yield the 3,11-diacyl-14-anhydroouabagenin 1,19-acetonide which is hydrogenated by use of a palladium catalyst to yield 3,11 - diacyl-14-desoxyouabagenin 1,19 - acetonide. This product is treated with ozone, then with zinc and acetic acid, and subsequently with aqueous alkaline alkanol to yield the 3β,11α-diacyloxy - 1β,5β,19,21 - tetrahydroxy - pregnan-20-one 1,19-acetonide (3β,11α-diacyloxy-1β,19-isopropylidenedioxy-5β,21 - dihydroxypregnan - 20 - one). The 21-hydroxy group is then selectively esterfied, typically with p-toluene sulfonyl chloride in pyridine or an analogous base and the resulting ester is treated with sodium iodide to yield the compound of the foregoing structural formula wherein A is a CH$_2$I group. Reduction with zinc, typically in acetic acid, removes the iodine and yields the 3β,11α-diacyloxy-1β,5β,19-trihydroxypregnan-20-one 1,19-acetonide. This 3,11-diester can be deesterified by treatment with aqueous alkaline alkanol and the resulting 1β,3β,5β,11α,19-pentahydroxypregnan-20-one 1,19-acetonide oxidized with chromic acid and pyridine to yield 1β,5β,19-trihydroxypregnane-3,11,20-trione 1,19-acetonide. Treatment with alumina removes a molecule of acetone and yields 5β,19-dihydroxypregn-1-ene-3,11,20-trione. This compound as well as the lower 11α-alkoxy-11,19-epoxypregn-4-ene-3,20-diones, produced therefrom by hydrogenation with palladium followed by acidic treatment in the corresponding alkanol, inhibit the sodium retention produced by aldosterone. Further hydrogenation with palladium-on-charcoal produces the 11α-alkoxy-11,19-epoxypregnane-3,20-dione which is likewise an aldosterone inhibitor.

The compounds which constitute this invention will be further illustrated by the following examples which are presented for the purpose of illustration only and are not to be construed as limiting the invention in spirit or in scope. In these examples quantities are indicated as parts by weight.

*Example 1*

A mixture of 15 parts of finely pulverized ouabagenin 1,19-acetonide is shaken with 600 parts of pyridine and 60 parts of acetic anhydride until solution occurs. Twelve hours later the solution is taken to dryness under vacuum and the residue is recrystallized from pyridine by addition of water.

To a solution of 11.25 parts of the 3,11-diacetyl-ouabagenin 1,19-acetonide thus obtained in 30 parts of anhydrous pyridine maintained at −15° C. is added a solution of 2.5 parts of thionyl chloride in 20 parts of pyridine in the course of 5 minutes with stirring. Agitation is continued for 10 minutes longer at −15° C. after which the mixture is diluted with chloroform, washed with aqueous sodium bicarbonate, dried over sodium sulfate, filtered and taken to dryness under vacuum. The crystalline residue is triturated with ether and collected by filtration. Recrystallized from ethanol, the 3-11-diacetyl-14-anhydro-ouabagenin 1,19-acetonide thus obtained melts at about 240–242° C. Infrared maxima are observed at 2.84, 3.42, 5.72, 6.13, 8.09, 9.06, 9.82, 10.94, and 12.78 microns. The rotation of the chloroform solution α$_D$ is −4.0°.

By substituting in the foregoing example, 70 parts of propionic anhydride for the acetic anhydride there is obtained 3,11-dipropionyl-14-anhydroouabagenin 1,19-acetonide.

*Example 2*

A mixture of 5.44 parts of 3,11-diacetyl-14-anhydro-ouabagenin 1,19-acetonide, 1.5 parts of 5% palladium-on-charcoal catalyst, and 50 parts of anhydrous acetic acid is shaken in an atmosphere of hydrogen until 1 equivalent is absorbed. The mixture is then filtered and the filtrate is evaporated to dryness under vacuum at 95° C. When the residue is triturated with acetone and ether a colorless crystalline product is obtained. The crystals are collected on a filter, washed with ether and dried. On recrystallization from acetone and petroleum ether there is obtained 3,11-diacetyl-14-desoxyouabagenin 1,19-acetonide melting at about 260–263° C. Infrared maxima are observed at 2.82, 3.39, 5.72, 6.13, 8.09, 9.52, and 10.38 microns. The rotation of the chloroform solution α$_D$ is +22.7°. The compound has the structural formula Substitution of 5.6 parts of 3,11-dipropionyl-14-anhydroouabagenin 1,19-acetonide as the starting material yields 3,11-dipropionyl-4-desoxyouabagenin 1,19-acetonide.

*Example 3*

A solution of 6 parts of 3,11-diacetyl-14-desoxyouabagenin 1,19-acetonide in 100 parts of ethyl acetate and 100 parts of dichloromethane is saturated with ozone at −80° for 1 hour. The solution is then stirred with 6 parts of zinc and 18 parts of acetic acid for 15 minutes. The mixture is diluted with dichloromethane and filtered. The filtrate is washed with aqueous sodium bicarbonate, dried over sodium sulfate, filtered and taken to dryness under vacuum. The residue is dissolved in 50% aqueous methanol containing 1.05 parts of potassium bicarbonate. This mixture is permitted to stand for 18 hours after which it is concentrated to a small volume at 30° C. and extracted with chloroform. The extract is dried over sodium sulfate and taken to dryness under vacuum. The residue, when triturated with acetone and ether, yields a crystalline product which on recrystallization from acetone forms 3β,11α-diacetoxy-1β,5β,19,21-tetrahydroxypregnan-20-one 1,19-acetonide melting at about 241–243° C. Infrared maxima are observed at 2.90, 2.98, 5.77, 8.09, 10.40, 10.95, and 12.50 microns. The rotation of the chloroform solution $\alpha_D$ is $+57.6°$. The compound has the structural formula

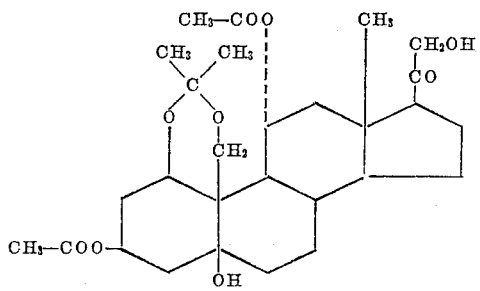

Substituting as a starting material 3,11-dipropionyl-14-desoxyouabagenin 1,19-acetonide there is obtained 3β,11α-dipropionoxy-1β,5β, 19, 21-tetrahydroxypregnan-20-one 19-acetonide which shows infrared maxima at about 2.91, 2.98, 5.78, and 8.09 microns.

*Example 4*

A mixture of 4.65 parts of 3β,11α-diacetoxy-1β,5β,19,21-tetrahydroxypregnan-20-one 1,19-acetonide, 2.75 parts of p-toluenesulfonyl chloride, and 50 parts of anhydrous pyridine is permitted to stand at 0° C. for 16 hours. To the mixture are added 40 parts of ice and 500 parts of water. The colorless crystalline precipitate which separates is collected on a filter, washed with water and ether, and dried. The 3β,11α-diacetoxy-21-(p-toluenesulfonoxy)-1β,5β,19-trihydroxypregnan-20-one 1,19-acetonide melts at about 205–208° C. with decomposition. Infrared maxima are observed at 2.83, 3.40, 5.78, 6.28, 8.02, 8.50, 10.08, 12.18 and 12.48 microns. The specific rotation of a chloroform solution $\alpha_D$ is $+60.6°$. A solution of 1 part of this product, 0.3 part of sodium iodide and 20 parts of acetone is refluxed 5 minutes and then evaporated to dryness. The residue is extracted with chloroform and the chloroform extract is filtered and evaporated to dryness. The residue, containing 3β,11α-diacetoxy-21-iodo-1β,5β,19 - trihydroxypregnan - 20 - one 1,19 - acetonide, is stirred with 1 part of zinc and 3 parts of acetic acid for 5 minutes. The mixture is diluted with chloroform and filtered. The filtrate is washed with aqueous sodium bicarbonate, dried over sodium sulfate, and evaporated to dryness. The crude crystalline residue is recrystallized from acetone and petroleum ether to give 3β,11α-diacetoxy - 1β,5β,19 - trihydroxypregnan - 20 - one 1,19-acetonide melting at about 229–230° C. Infrared maxima are observed at 2.82, 3.38, 5.76, 5.88, 7.22, 8.09, 11.55, and 12.50 microns. The rotation of the chloroform solution $\alpha_D$ is $+64.9°$.

Substituting as the starting material 3β,11α-dipropionoxy-1β,5β,19,21-tetrahydroxypregnan-20-one 1,19-acetonide there is obtained 3β,11α-dipropionoxy-1β,5β,19-trihydroxypregnan-20-one 1,19-acetonide. The infrared absorption spectrum shows maxima at 2.83, 3.39, 5.77, 5.87 and 8.08 microns. The compound has the structural formula

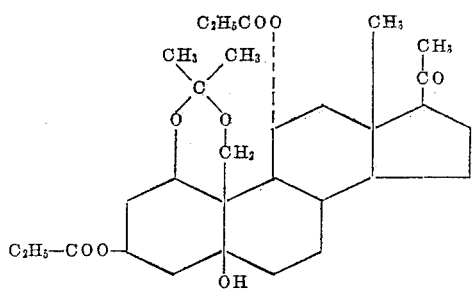

*Example 5*

A mixture of 3 parts of 3β,11α-diacetoxy-1β,5β,19-trihydroxypregnan-20-one 1,19-acetonide, 12 parts of sodium carbonate, 50 parts of water and 100 parts of methanol is refluxed for 4 hours in an atmosphere of nitrogen. The mixture is then distilled under vacuum until the methanol has been removed. The resulting aqueous solution is thoroughly extracted with chloroform. The chloroform extract is dried over anhydrous sodium sulfate, filtered and evaporated to dryness. The residue is dissolved in pyridine and stirred for 18 hours with a mixture of 3 parts of chromic anhydride and 40 parts of pyridine. Then the mixture is diluted with 200 parts of chloroform and filtered. The filtrate is washed with aqueous sodium bicarbonate, dried over sodium sulfate, filtered and evaporated to dryness under vacuum. The residue is dissolved in 100 parts of ethanol and the solution is stirred at reflux for 1 hour with 29 parts of basic alumina. The mixture is filtered and the alumina is twice extracted with 100 part portions of ethanol. The ethanolic extracts are combined and taken to dryness under vacuum. The residue is dried under vacuum to yield 5β,19-dihydroxypregn-1-ene-3,11,20-trione. A methanolic solution shows an ultraviolet maximum at about 227 millimicrons with a molecular extinction coefficient of about 11,000. A chloroform solution shows infrared maxima at about 2.72, 2.90, 3.37, 5.83 and 5.93 microns.

*Example 6*

A mixture of 4 parts of 5β,19-dihydroxypregn-1-ene-3,11,20-trione, 100 parts of methanol and 0.4 part of a 5% palladium-on-charcoal catalyst is stirred in an atmosphere of hydrogen until absorption ceases. The resulting mixture is filtered and 0.4 part of p-toluenesulfonic acid are added to the filtrate. The solution is permitted to stand for 12 hours and then concentrated to a small volume and cooled. The precipitate is collected on a filter washed with a small amount of methanol and dried to yield 11α-methoxy-11,19-epoxypregn-4-ene-3,20-dione. A methanolic solution shows an ultraviolet maximum at about 240 millimicrons with an extinction coefficient of about 15,000. Substitution of 100 parts of ethanol in the foregoing procedure yields 11α-ethoxy-11,19-epoxypregn-4-ene-3,20-dione, which shows ultraviolet maximum at about 240 millimicrons with a molecular extinction coefficient of about 15,600. It has the structural formula

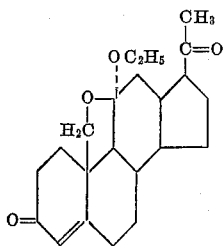

*Example 7*

A mixture of 2 parts of 11α-methoxy-11,19-epoxy-pregn-4-ene-3,20-dione, 50 parts of methanol and 0.2 part of 5% palladium-on-charcoal catalyst is stirred in an atmosphere of hydrogen until absorption ceases. The mixture is filtered and the filtrate is concentrated to a small volume and cooled. The product which crystallizes is collected on a filter, washed with methanol and dried. There is thus obtained 11α-methoxy-11,19-epoxy-pregnane-3,11,20-trione melting at about 147–148° C.

What is claimed is:
1. 5β,19-dihydroxypregn-1-ene-3,11,20-trione.
2. 3β,11α-diactyl-14-desoxyoubagenin, 1,19-acetonide.
3. A compound of the structural formula

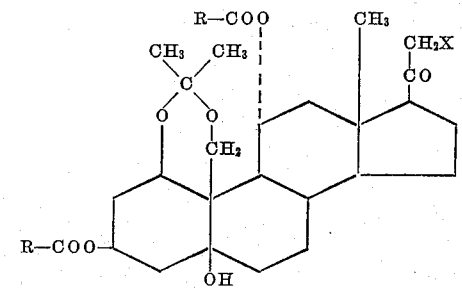

wherein R is a lower alkyl radical and X is a member of the class consisting of hydrogen, iodine and hydroxy radicals.
4. 3β,11α-diacetoxy-1β,5β,19,21-tetrahydroxypregnan-20-one 1,19-acetonide.
5. 3β,11α-diacetoxy-1β,5β,19-trihydroxypregnan-20-one, 1,19-acetonide.

No references cited..

UNITED STATES PATENT OFFICE
CERTIFICATE OF CORRECTION

Patent No. 2,976,284                March 21, 1961

John S. Baran

It is hereby certified that error appears in the above numbered patent requiring correction and that the said Letters Patent should read as corrected below.

Column 3, line 3, for "-dipropionyl-4-" read -- -dipropionyl-14- --; lines 47 and 48, for "-one 19-acetonide" read -- -one 1,19-acetonide --; column 6, line 3, for "3β,11α-diactyl-" read -- 3β,11α-diacetyl- --.

Signed and sealed this 17th day of October 1961.

(SEAL)
Attest:

ERNEST W. SWIDER                DAVID L. LADD
Attesting Officer                  Commissioner of Patents

USCOMM-DC